US008219834B2

(12) United States Patent
Basak et al.

(10) Patent No.: US 8,219,834 B2
(45) Date of Patent: Jul. 10, 2012

(54) PREDICTIVE POWER GATING WITH OPTIONAL GUARD MECHANISM

(75) Inventors: Jayanta Basak, New Delhi (IN); Pradip Bose, Yorktown Heights, NY (US); Alper Buyuktosunoglu, White Plains, NY (US); Anita Lungu, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 12/539,978

(22) Filed: Aug. 12, 2009

(65) Prior Publication Data

US 2011/0040995 A1 Feb. 17, 2011

(51) Int. Cl.
*G06F 1/00* (2006.01)
*G06F 1/26* (2006.01)
*G06F 1/32* (2006.01)
(52) U.S. Cl. .......................... 713/300; 713/320; 713/324
(58) Field of Classification Search .................. 713/300, 713/320, 324
See application file for complete search history.

(56) References Cited

U.S. PATENT DOCUMENTS

| 5,682,273 | A | 10/1997 | Hetzler |
| 5,954,820 | A * | 9/1999 | Hetzler ........................ 713/323 |
| 7,134,028 | B2 | 11/2006 | Bose et al. |
| 7,183,825 | B2 | 2/2007 | Padhye et al. |
| 7,380,147 | B1 * | 5/2008 | Sun ............................... 713/323 |
| 7,421,601 | B2 | 9/2008 | Bose et al. |
| 7,516,346 | B2 | 4/2009 | Pinheiro et al. |
| 7,856,563 | B1 | 12/2010 | Sade et al. |
| 2003/0105983 | A1 | 6/2003 | Brakmo et al. |
| 2005/0120256 | A1 | 6/2005 | Lu |
| 2005/0174159 | A1 | 8/2005 | Rozen et al. |
| 2006/0005053 | A1 | 1/2006 | Jones, Jr. et al. |
| 2006/0184287 | A1 * | 8/2006 | Belady et al. ................ 700/291 |
| 2006/0259791 | A1 | 11/2006 | Dockser |
| 2007/0300083 | A1 | 12/2007 | Goodrum et al. |
| 2008/0082753 | A1 | 4/2008 | Licht et al. |
| 2009/0265568 | A1 | 10/2009 | Jackson |
| 2009/0327780 | A1 | 12/2009 | Dawkins et al. |
| 2010/0122100 | A1 | 5/2010 | Strumper |
| 2010/0218005 | A1 * | 8/2010 | Jain et al. ...................... 713/300 |
| 2010/0332876 | A1 * | 12/2010 | Fields et al. .................. 713/323 |
| 2010/0332883 | A1 | 12/2010 | Saxe et al. |
| 2011/0161627 | A1 * | 6/2011 | Song et al. ..................... 712/30 |

OTHER PUBLICATIONS

Basak, Jayanta et al., "Two-Level Guarded Predictive Power Gating", U.S. Appl. No. 12/539,941; filed Aug. 12, 2009.
U.S. Appl. No. 13/024,781, 1 page.

(Continued)

*Primary Examiner* — Mark Connolly
(74) *Attorney, Agent, or Firm* — Francis Lammes; Stephen J. Walder, Jr.; William Stock

(57) ABSTRACT

A mechanism is provided for predictively power gating a set of units within the data processing system. A second-level power gating controller monitors a set of events for each unit in a set of units within the data processing system. The second-level power gating controller identifies idle sequences of a predetermined set of cycles within the events from each unit where the unit is idle. The second-level power gating controller determines preceding sequences of a predetermined length that precede the idle sequences. The second-level power gating controller determines an accuracy of the preceding sequences. Responsive to the accuracy being above a threshold, the second-level power gating controller sends a permit command to a first-level power gating mechanism associated with the unit to permit power gating of the unit.

20 Claims, 8 Drawing Sheets

OTHER PUBLICATIONS

Brooks, David et al., "Dynamic Thermal Management for High-Performance Microprocessors", Proceedings of the 7th International Symposium on High-Performance Computer Architecture, Monterrey, Mexico, Jan. 2001, 12 pages.

Gupta, Aarti et al., "Toward Formalizing a Validation Methodology Using Simulation Coverage", ACM/IEEE 34th Annual Design Automation Conference, 1997, pp. 740-745.

Lungu, Anita et al., "Multicore Power Management: Ensuring Robustness via Early-Stage Formal Verification", Seventh ACM/IEEE International Conference on Formal Methods and Models for Codesign (MEMOCODE '09), Cambridge, MA, Jul. 2009, 10 pages.

Madan, Niti et al., "Guarded Power Gating in a Multi-Core Setting", Workshop on Energy-Efficient Design (WEED 2010), Jun. 17, 2010, pp. 26-31.

Hu, Zhigang et al., "Microarchitectural Techniques for Power Gating of Execution Units", IEEE International Symposium on Low Power Electronics and Design, Aug. 2004, pp. 32-37.

Youssef, Ahmed et al., "Dynamic Standby Prediction for Leakage Tolerant Microprocessor Functional Units", International Symposium on Microarchitecture, Proc. of the 39th Annual IEEE/ACM International Symposium of Microarchitecture, http://portal.acm.org/citation.cfm?id=1194864, 2006, 4 pages.

Office Action mailed Nov. 18, 2011 for U.S. Appl. No. 12/539,941; 8 pages.

Response to Office Action filed with the USPTO on Feb. 2, 2012 for U.S. Appl. No. 12/539,941; 9 pages.

Notice of Allowance mailed Mar. 5, 2012 for U.S. Appl. No. 12/539,941, 6 pages.

* cited by examiner

PREDICTIVE POWER GATING WITH OPTIONAL GUARD MECHANISM

BACKGROUND

The present application relates generally to an improved data processing apparatus and method and more specifically to an apparatus and method for predictive power gating.

In the field of microprocessor architectures, predicting certain key events ahead of their actual occurrence is a key problem. Such predictive algorithms are usually applied for the purposes of enhancing net performance. For example, predicting the direction and target of conditional branch instructions before they are actually executed helps performance, provided the misprediction rate is below a certain threshold. In the area of power management, a key problem is predicting the usage (activity) or lack thereof (inactivity) of a given resource ahead of the actual onset of such an event (where "event" means a minimum duration of activity or inactivity).

Prior approaches of predictive algorithms for use in computer architecture applications involve the use of table-lookup oriented state-based predictive algorithms. In such approaches, a prediction table (single or multi-level) indexed by some form of current processor state (e.g. the program counter), possibly in combination with history vectors that capture past behavior, is usually employed. In such existing art, the method employed is invariably that of predicting specific future events (e.g. branch direction and target) from past history and present processor state. Prior table-based predictive techniques have severe limitations when it comes to practical implementation in the particular problem domain of power gating, since the goal is to predict a "long enough" duration "idle sequence" of the resource being targeted for power gating. However, it is not enough to predict that a given unit will be idle in the next cycle or after a certain number of cycles. Adopting currently practiced state-based table-lookup oriented prediction, or even Markov-based state predictors would result in impractical hardware complexity.

Another problem in dynamic power-gating control is that such a controller unnecessarily works and consumes power, even if the net power savings is negative, because such a controller is not equipped with intelligence of when to turn off or on in response to monitored workload behavior and resource usage pattern within the microprocessor resources.

While power gating is a viable knob for leakage power management in microprocessors, current approaches only use a single level of control for predictive power gating. This control logic is usually implemented as a finite state machine controller that decides when to initiate power gating and when to disable it. In this class of power-gating control, an important parameter is the "breakeven point" (BEP), measured in processor cycles. This parameter is pre-computed to represent a value that means that the resource being power-gated needs to be OFF for at least BEP cycles in order for power gating to pay off; otherwise, if the resource is powered back on before BEP cycles, there is a net increase in consumed energy. The BEP value depends on the size of the macro that constitutes the resource being power-gated, as well as other factors that characterize the exact header or footer transistor design that is used as part of the gating circuitry. In such a single-level predictive power gating controller, there will be occasional mispredictions. That is, power gating will be initiated when it should not have been. In general, analysis shows that there could be cases where the overall power savings for a particular workload could turn out to be negative. The current class of single-level predictive algorithms cannot guarantee that the power-gating circuitry will always work for the intended purpose of effecting a net power gain.

SUMMARY

In one illustrative embodiment, a method, in a data processing system, is provided for predictively power gating a set of units within the data processing system. The illustrative embodiment monitors a set of events for each unit in a set of units within the data processing system. The illustrative embodiment identifies idle sequences of a predetermined set of cycles within the events from each unit where the unit is idle. The illustrative embodiment determines preceding sequences of a predetermined length that precede the idle sequences. The illustrative embodiment determines an accuracy of the preceding sequences. The illustrative embodiment sends a permit command to a first-level power gating mechanism associated with the unit to permit power gating of the unit in response to the accuracy being above a threshold.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
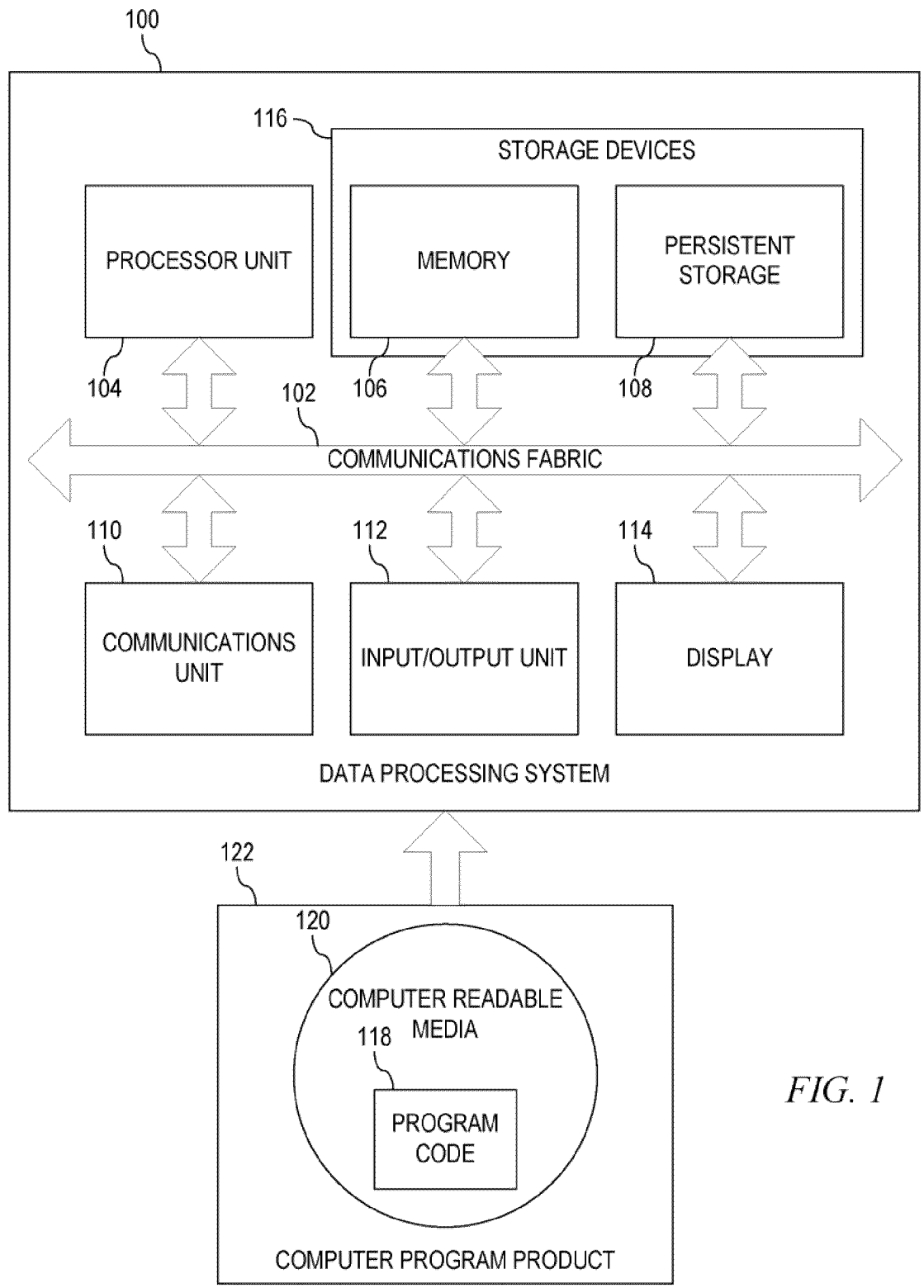
FIG. 1 depicts a block diagram of a data processing system in which illustrative embodiments may be implemented.

In one illustrative embodiment, a mechanism is provided for assessing the inherent predictability and detectability based on observed usage behavior at a hardware level. The illustrative embodiment may use a global second-level control algorithm serving as a guard mechanism that decides when to enable or disable each first-level power-gating controller associated with the corresponding monitored unit for power gating. Additionally, the illustrative embodiment may use a set of past history sequences for which the future will most likely witness a favorable power gating opportunity (FPGO) to enable or disable each monitored unit for power gating.

In another illustrative embodiment, a mechanism is provided for implementing simple heuristics to assess the power-saving efficiency of the lower-level (i.e. the first-level) predictor while making the decision to enable/disable that lower-level predictor. The resulting mechanism again serves as a guarded mechanism, where the overall power-gating control mechanism is guaranteed not to add more power than what is saved in extreme workload instances. As such, the second level control heuristic serves as a guard mechanism to ensure that the net power savings effected is substantially never negative, and, if the net power savings is ever negative, the amount of negative savings is strictly bounded to a small percentage. The illustrative embodiment consists of several different alternate heuristics to effect the guard mechanism in hardware for preferred speedy actuation at fine time granularities or in software if slower actuation is acceptable.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
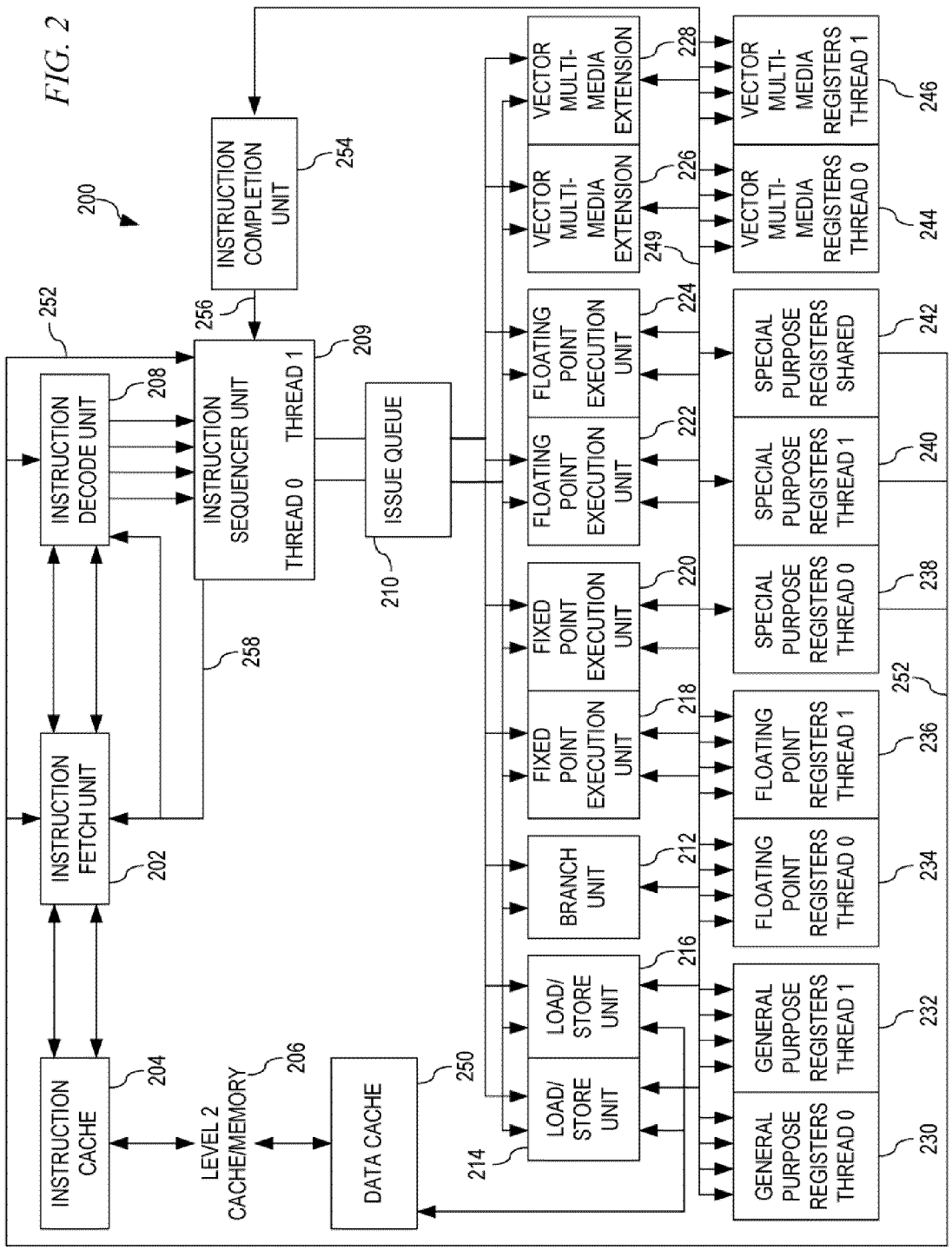
FIG. 2 depicts an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of using power proxies combined with on-chip actuators to meet a defined power target, this is only an example and is not intended to state or imply any limitation with regard to the features of the present invention. To the contrary, the illustrative embodiments are intended to include distributed data processing environments and embodiments in which power proxies combined with on-chip actuators may be used to meet a defined power target.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form. In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multithreading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Power gating is a technique where units or components within a data processing system that are not in use are temporarily turned off to reduce the overall leakage power of the data processing system. This temporary shutdown time can also call as "low power mode" or "inactive mode". When units are required for operation once again they are activated to "active mode". These two modes are switched at the appropriate time and in the suitable manner to maximize power performance while minimizing impact to performance. Thus, the goal of power gating is to minimize leakage power by temporarily cutting power off to selective units that are not required in that mode.

In order to predictively power gate a unit within a data processing system, one illustrative embodiment provides a mechanism to predict possible history sequences for which a particular future sequence may appear. In the illustrative embodiment, a unit may be an execution unit within a microprocessor core, a microprocessor core, an entire microprocessor, or another device within the data processing system. Thus, in the context of power gating, a determination is made as to conditions under which a particular microprocessor unit will remain idle for a given number S of clock cycles. The illustrative embodiment identifies history sequences of certain length W (W cycles) that precede where the next S cycles of the microprocessor unit will remain idle. Once one or more history sequences are identified and an idle state can be predicted using those history sequences with high accuracy, then the particular microprocessor unit may be predictively power gated or turned off when the sequence is next encountered.

Figure 3:
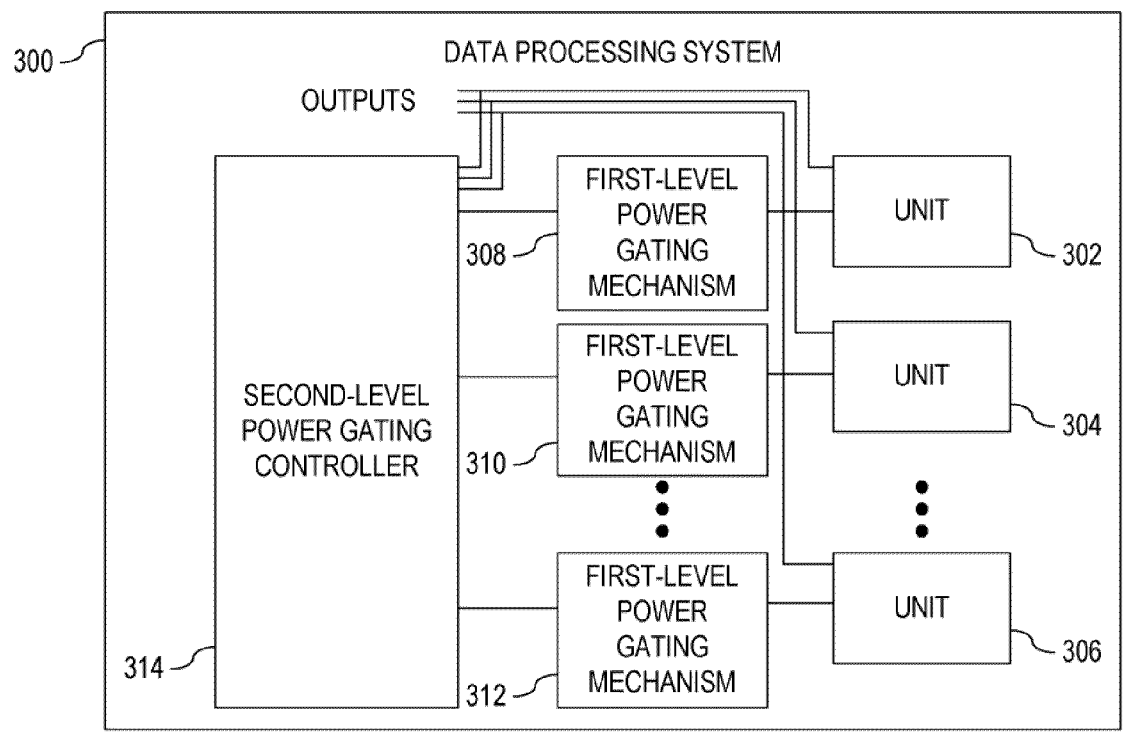
FIG. 3 depicts a block diagram of a two-level predictive power gating controller within a data processing system in accordance with an illustrative embodiment.
Figure 3:
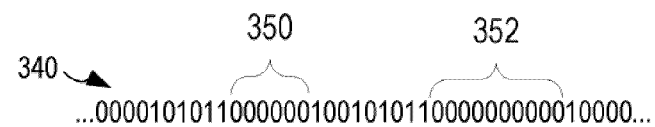
Figure 3:
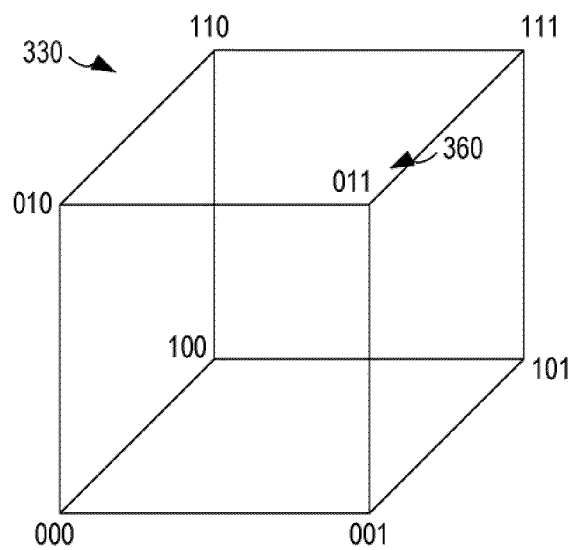

FIG. 3 depicts a block diagram of a two-level predictive power gating controller within a data processing system in accordance with an illustrative embodiment. Data processing system 300 comprises units 302, 304, and 306 that each have an associated first-level power gating mechanism 308, 310, and 312, with or without an embedded first-level power-gating control algorithm. Units 302, 304, and 306 may be an execution unit within a microprocessor core, a microprocessor core, an entire microprocessor, or another device within the data processing system 300 that consumes power. Data processing system 300 also comprises second-level power gating controller 314 (preferably implemented as code embedded in system management software or firmware) that identifies sequences of events for each of units 302, 304, and 306 in terms of 1's and 0's where a "1" implies that a particular unit in units 302, 304, and 306 is in use or "ON" and a "0" that implies the particular unit is idle or "OFF". In the context of power-efficient computing, if a sequence of 0s can be predicted beforehand for a unit, then power gating controller 314 may issue commands for that particular resource or unit to the associated power gating mechanism 308, 310, or 312 so that that particular resource or unit may be gated off in order to save power consumption.

Power gating controller 314 explicitly counts history sequences of a specified length W for which each of units 302, 304, and 306 are idle for a predetermined number S of cycles in the entire trace of execution events. Power gating controller 314 dynamically determines length W, which will be described in detail below. Note that there are $2^W$ possible history sequences of a specified length W. Power gating controller 314 may store the history sequences in data structure, such as a table, an array, a matrix, or the like. In this example, the history sequences may be visualized as spanning W-dimensional hypercube 330 with $2^W$ corners, where W equals 3 and thus hypercube 330 has 8 corners that represent preceding sequences that precede the idle sequences. At each corner, different event activities happen. If at a particular corner an observation is made that that corner identifies that for the predetermined next S cycles, for example, 5 cycles, a unit, such as unit 302, 304, or 306, is always idle as is shown in sections 350 and 352 of sequence 340, then power gating controller 314 may identify that corner 360 of hypercube 330 as a "Pure" corner. That is since, sequence 340 indicates that the unit is idle for 6 cycles in section 350 and is idle for 10 cycles in section 352, which are both greater than the exemplary 5 cycles, and that the preceding W or 3 cycles are both "011," then corner 360 of hypercube 330 would be a "Pure" corner. In other words, in the future trace of a unit, such as unit 302, 304, or 306, whenever the event activities for W cycles map to corner 360 of hypercube 330, power gating controller 314 predicts that for the next S cycles that particular unit will remain idle and that the unit may be turned off without causing a net increase in consumed energy. If, for example, sequence unit 340 were for unit 302 and power gating controller 314 identified corner 360 as a "Pure" corner, then, the next time the sequence "011" was output by unit 302, power gating controller 314 would issue a control signal to power gating mechanism 308 that will allow power gating mechanism 308 to power gate or turn off unit 302.

However, power gating controller 314 identifying an absolutely pure corner of hypercube 330 may be rare. Therefore, power gating controller 314 counts the number of times for which a hypercube corner contains the desired sequences of length S (here it is a sequence of zeros). Note that, in real-life traces, most of the corners of hypercube 330 will remain empty for a particular program trace because the history may not take those particular sequences. Power gating controller 314 ignores empty corners of hypercube 330 and for any non-empty hypercube corner, power gating controller 314 computes an "Accuracy" to represent the purity index of that particular corner. Power gating controller 314 lets i be the index of a particular non-empty hypercube corner, lets "desiredOutcome" represent the number of desired sequences that have occurred in the corner i, and lets "undesiredOutcome" represent the number of sequences that have occurred in the corner i which are different from the desired sequences. In this example, power gating controller 314 computes the accuracy of any corner (i) using the following formula:

$$\text{Accuracy}(i) = \frac{desiredOutcome(i)}{desiredOutcome(i) + undesiredOutcome(i)}$$

As an example, if i='11001' with W=5 and if in the entire trace of events of that microprocessor unit (say of length 1000000), then corner i has been instantiated 1000 times. In other words, 1000 times the sequence '11001' has occurred in the activity trace. If the desired sequence is a sequence of zeros of length 20 and if in the trace there are 700 instances where after every occurrence of '11001', the desired sequence of the unit being idle for the predetermined number of S cycles has occurred in the event activity trace. Therefore, we can say that desiredOutcome(i)=700, and undesiredOutcome(i)=300 such that desiredOutcome(i)+undesiredOutcome(i)=1000. Therefore, the accuracy of that particular corner is 0.7 or 70% accurate.

Note that, the illustrative embodiments refer to the term "Accuracy" to quantify the purity index of a corner. The term "Accuracy" is valid with respect to prediction. If the event activity trace is sufficiently long and the activity trace represents a stationary time series, then purity essentially quantifies the sufficient statistic of that particular hypercube corner. Thus, for the same stationary time series, power gating controller 314 may predict the desired sequence for the history represented by the hypercube corner with an accuracy equal to the purity index. This is the basic reason why the illustrative embodiments term the purity index as the accuracy. Since the accuracy represents the sufficient statistic of that particular corner, under certain circumstances, the desired sequence may not be predicted with any better performance than accuracy for that particular history represented by that corner.

In an instance when the accuracy of a corner is very low, for example, 0.1, then power gating controller 314 may then only predict the desired sequence with a very low accuracy. In other words, if the accuracy is 0.1 then power gating controller 314 may be correct only in 10% cases with respect to the associated corner of that hypercube. As a result, for 90% cases, predictions made by power gating controller 314 for that particular corner of the hypercube will be wrong. This has an adverse effect in the context of power gating. Thus, power gating controller 314 additionally uses an AccuracyCutOff threshold to determine when to allow power gating mechanism 308, 310, and 312 to enforce power gating. That is, if the accuracy is less than the AccuracyCutOff threshold, then that particular unit will not be turned off for that particular history.

In addition to computing an accuracy, power gating controller 314 also computes an overall "Predictability (P)" of the execution events of each of unit 302, 304, or 306, in order to predict when the unit can be turned off for S cycles with an accuracy P. In order to calculate a predictability of the execution events for each of unit 302, 304, or 306, power gating controller 314 lets the set of non-empty corners of the hypercube be $\Lambda$, such that $|\Lambda| \leq 2^W$ for a specified length W, and lets $\Omega$ represent the set of corners of the hypercube, such that for all $i \in \Omega$, Accuracy(i)≧AccuracyCutOff. In this example, power gating controller 314 computes predictability (P) using the following formula:

$$P = \frac{\sum_{i \in \Omega} desiredOutcome(i)}{\sum_{i \in \Omega} desiredOutcome(i) + undesiredOutcome(i)}$$

Power gating controller 314 considers only those non-empty corners of the hypercube whose purity index is greater than the AccuracyCutOff threshold and then considers the aggregate purity to compute the overall predictability. The AccuracyCutOff threshold may be determined by the hardware design and power requirement to turn on each of unit 302, 304, or 306. As with the accuracy computed previously, the predictability may not be calculated with a performance better than accuracy for any corner of the hypercube for particular history length. Since accuracy scores are aggregated to compute predictability only for those non-empty corners with accuracy greater than the AccuracyCutOff threshold, power gating controller 314 may not predict with a better performance than predictability.

In calculating the predictability, if the AccuracyCutOff threshold is increased, the predictability will increase and power gating controller 314 will be able to predict the desired sequence of IDLE states of each of unit 302, 304, or 306 with better accuracy. However, as the threshold "AccuracyCutOff" is increased, the set of corners $\Omega$ of the hypercube will shrink. That is, the number of corners which are taken into account to compute the measure predictability will decrease. Therefore, information about the desired sequences actually occurring in most of the corners of the hypercube may be lost. In other words, as the AccuracyCutOff threshold is increased, most of the desired sequences may go undetected. In order to capture the property of how many desired sequences are actually detected by the technique, power gating controller 314 also computes a "Detectability (D)" using the following formula:

$$D = \frac{\sum_{i \in \Omega} desiredOutcome(i)}{\sum_{j \in \Lambda} desiredOutcome(j)}$$

Power gating controller 314 measures the ratio of the number of desired sequences that are actually predicted and the total number of desired sequences present in the entire event activity trace for a particular microprocessor unit. For example, there may be 1000 zero sequences of length S, out of which only 10 are predicted with very high accuracy (say 100%). Hence, power gating controller 314 has then detected only 1% of the zero sequences in the execution time events. Therefore, 99% of the sequences remain undetected and consume power in the idle state.

Power gating controller 314 then uses the computed predictability and the detectability to dynamically determine the length W. In order to calculate length W, power gating controller 314 uses an initial trial value of W to first calculate the predictability and the detectability as detailed previously. Then using an idle energy constant (E1) spent in keeping the unit powered-on for S cycles and an active energy constant (E2) used to turn the particular unit back on, an optimal value of length $W_{opt}$ is initially estimated by multiplying detectability (D) by the idle energy constant (E1) and adding the calculated product to the product calculated by multiplying predictability (P) by the active energy constant (E2), $W_{opt}=\arg\max_W\{D(W)*E1+P(W)*E2\}$. This calculated optimal value of length $W_{opt}$ is then used to calculate a new predictability (P) and detectability (D) and then an updated optimal value of length W, etc. The equation above means that the final $W_{opt}$ value is arrived at as an iterative update-and-test process, in which the latter converges to a step in which $D*E1+P*E2$ attains the maximum value.

One constraint power gating controller 314 has in calculating optimal value of length W, which must not be violated, is that predictability (P) should be greater than or equal to a lower bound $P_0 (P_0 \leq P)$. Thus, the initial trail value of length W that is used is large and reduced step by step as described previously. Decreasing the value of length W step by step should cause predictability (P) to decrease and detectability (D) to increase. In calculating optimal value of length $W_{opt}$, power gating controller 314 stops calculating $W_{opt}$ when either predictability (P) reaches $P_0$ or detectability (D) shows a sharp sudden drop, whichever happens first.

Depending on the monitored value of predictability (P) and detectability (D), power gating controller 314 decides whether to disable or re-enable each of power gating mechanism 308, 310, or 312 associated with a units 302, 304, and 306. The exact combination threshold of detectability (D)+predictability (P) that would trigger a "enable" or "disable" directive to a given power gating mechanism 308, 310, or 312 is dependent on several microarchitecture and circuit-specific design parameters. Power gating controller 314 learns the prediction accuracy of a power-gating condition using the Accuracy(i) learn for each length W of the history hypercube.

In this illustrative embodiment, the second level guard mechanism, i.e. second-level power gating controller 314, may be preferably implemented in software or firmware as part of the system-level support for on-chip power management, although one of ordinary skill in the art would realize a hardware implementation of the illustrative embodiment may be possible without departing from the spirit and scope of the invention. In this illustrative embodiment, the first-level power-gating mechanism, i.e. first-level power gating mechanism 308, 310, or 312, may include a separate, local hardware controller to assist in power gating. Depending on implementation, the first-level power-gating mechanism may just be the circuit-level facility to effect power gating, or the first-level power-gating mechanism may have a built-in (preferably) hardware controller that implements its own power-gating policy, modulated by the second-level guard mechanism, although one of ordinary skill in the art would realize a software implementation of the illustrative embodiment may be possible without departing from the spirit and scope of the invention.

Figure 4:
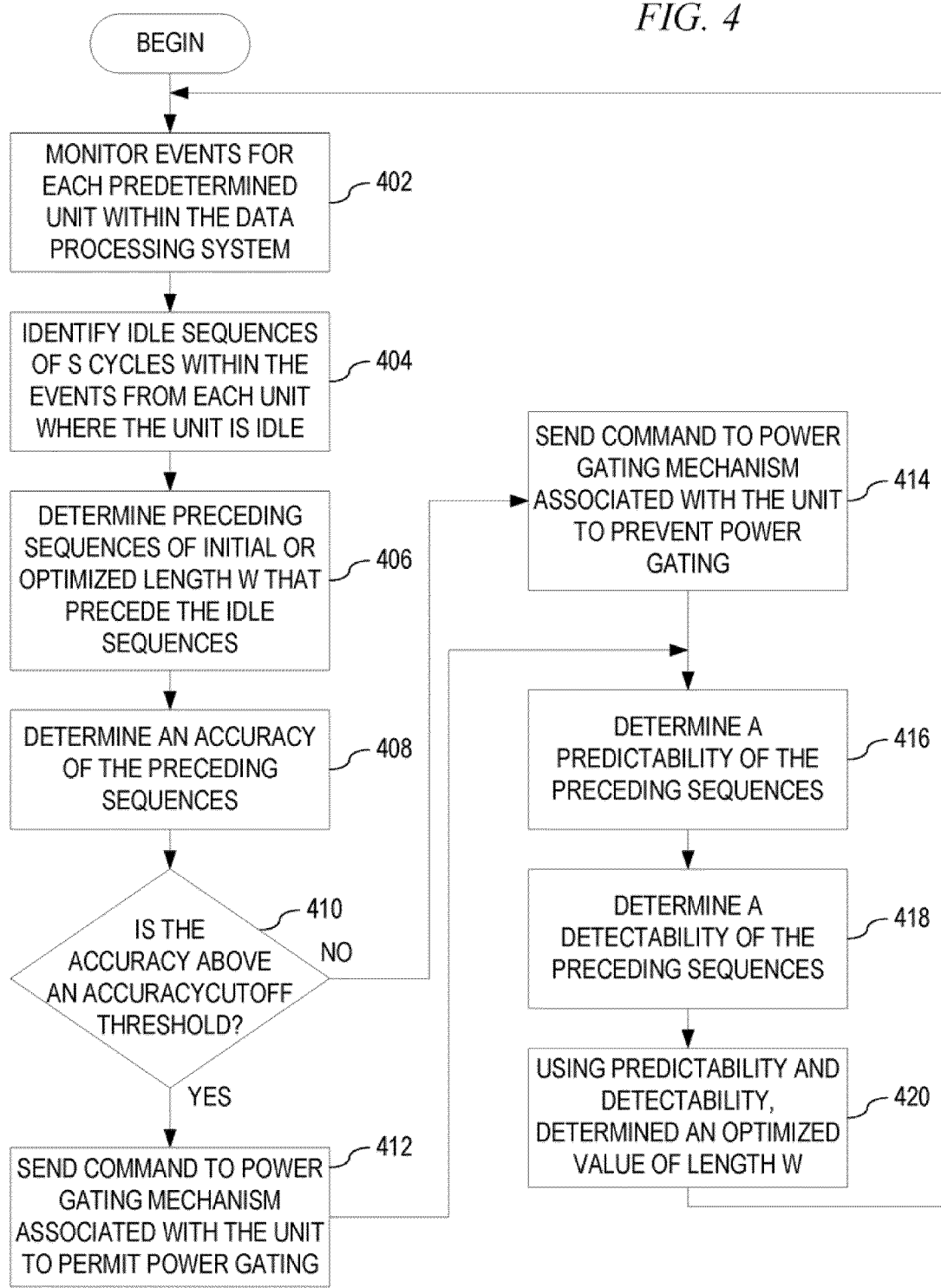
FIG. 4 depicts a flowchart for the operation performed by a two-level guarded power gating controller in predictively power gating a set of units within a data processing system in accordance with an illustrative embodiment.

FIG. 4 depicts a flowchart for the operation performed by a two-level guarded power gating controller in predictively power gating a set of units within a data processing system in accordance with an illustrative embodiment. As the operation begins, the second-level power gating controller monitors events for each predetermined unit within the data processing system (step 402). The second-level power gating controller identifies idle sequences of S cycles within the events from each unit where the unit is idle (step 404). The second-level power gating controller determines preceding sequences of an initial or an optimized length W that precede the idle sequences (step 406). The second-level power gating controller then determines an Accuracy of the preceding sequences (step 408). The second-level power gating controller determines whether the Accuracy is above an AccuracyCutOff threshold (step 410).

If at step 410 the Accuracy is above an AccuracyCutOff threshold, then the second-level power gating controller sends a command to the power gating mechanism associated with the unit to permit power gating of the unit (step 412). If at step 410 the Accuracy fails to be above an AccuracyCutOff threshold, then the second-level power gating controller sends a command to the power gating mechanism associated with the unit to prevent power gating of the unit (step 414). From steps 412 and 414 the second-level power gating controller determines a predictability of the preceding sequences (step 416). The second-level power gating controller then determines a detectability of the preceding sequences (step 418). Using the predictability and the detectability, the second-level power gating controller determines an optimized value of length W which is used in step 406 (step 420), with the operation returning to step 402 thereafter.

In order to predictively power gate a unit within a data processing system, another illustrative embodiment provides mechanisms for guarded predictive power gating. A first mechanism uses a success monitor to assess dynamic benefits of a predictive scheme. The success monitor enhances power-gating predictions by not using power gating when power gating fails to save energy and thereby decreases the performance penalty associated with power gating. A second mechanism uses a token counting guard that provides a provable worst-case bound on the possible penalty associated with mispredictions.

Figure 5:
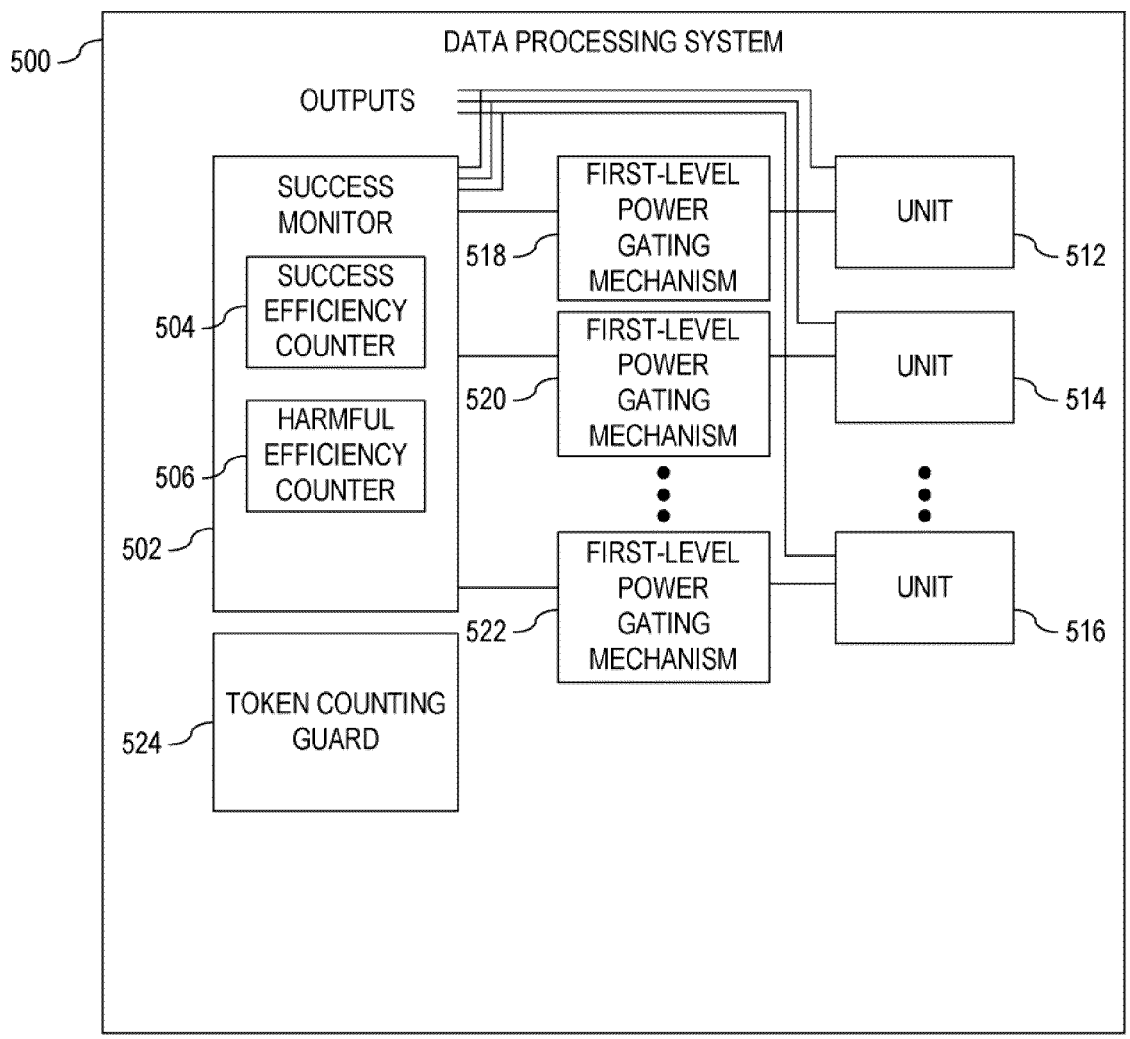
FIG. 5 depicts a block diagram of a two-level guarded predictive power gating control mechanism within a data processing system in accordance with an illustrative embodiment.

FIG. 5 depicts a block diagram of a two-level guarded predictive power gating control mechanism within a data processing system in accordance with an illustrative embodiment. In data processing system 500, success monitor 502 uses success efficiency counter 504 that counts successful instances per monitoring interval, and harmful efficiency counter 506 that counts harmful instances per monitoring interval counter 506, to dynamically estimate the success or loss of a policy for a particular unit in the set of units 512, 514, and 516. That is, each of units 512, 514, and 516 have an associated one of success efficiency counter 504 and harmful efficiency counter 506. Values may be obtained from success efficiency counter 504 and harmful efficiency counter 506 for a specified monitoring interval.

In the context of power gating, success monitor 502 identifies a successful instance as any compensated cycle (i.e., a cycle when a power gated unit remains idle after reaching a break-even point). A break-even point is a point in time when the cumulative leakage energy savings equals the energy overhead. Every time power gating mechanisms 518, 520, and 522 power gate units 512, 514, or 516, an energy overhead cost is incurred. This energy overhead is due to distributing sleep signals to the header transistor before the unit is actually turned off and turning off the sleep signal and driving the voltage VDD when the unit is powered-on again. The time between the decision to power gate and when the unit has reached the break-even point is considered "uncompensated," and the time after the break-even point is "compensated." Thus, success efficiency counter 504 increments each time the unit remains in a power gated compensated state and harmful efficiency counter 506 increments each time the unit goes from a power gated uncompensated state to being active again during the monitoring interval.

By subtracting the value from success efficiency counter 504 from the value of harmful efficiency counter 506, success monitor 502 tracks energy savings or penalties and drives an enable/disable signal to each of power gating mechanisms 518, 520, and 522 associated with units 512, 514, and 516. When success monitor 502 estimates that the power gating policy has been harmful over the previous monitoring interval, success monitor 502 disables the policy during the next monitoring interval. Otherwise, success monitor 502 leaves the policy enabled. Regardless of whether the power gating policy is enabled or disabled, success efficiency counter 504 and harmful efficiency counter 506 continue to increment over a monitoring interval and success monitor 502 uses the information from success efficiency counter 504 and harmful efficiency counter 506 to re-enable power gating when success monitor 502 expects power gating to be beneficial. The information from success monitor 502 may be used by a hardware mechanism or by a high level software entity to dynamically change the power gating policy.

Success monitor 502 may also issue tokens, one token corresponding to the leakage energy saved or used by a unit during one cycle. Success monitor 502 uses one token as the reward of a successful instance. A harmful instance is represented by any case when the unit needs to be woken up before reaching the break-even point. Success monitor 502 assigns a cost equal to the energy overhead for that unit for any harmful state. The unit might, in fact, have been idle for a significant number of cycles before being woken up, so using the pessimistic estimate might disable power gating even when the unit was marginally saving energy. However, assigning a cost equal to the energy overhead for that unit for any harmful state provides a guarantee that the energy penalty is below the bound set by the user by using token counting guard mechanism 524.

Token counting guard mechanism 524 provides a guarantee on the worst-case behavior of a policy. The guarantee is given over a time interval, called the guarantee interval, which is an integer multiple of the monitoring interval. Token counting guard mechanism 524 uses associated tokens to limit the power gating scheme implemented in data processing system 500. One token equals the leakage power of the unit over one cycle. A token bag holds the tokens that a unit may consume over the course of one guarantee interval. Token counting guard mechanism 524 updates the token bag as follows. At the beginning of a guarantee interval, token counting guard mechanism 524 resets the token bag to a fixed, non-zero value that represents the entire amount of energy penalty that may be tolerated over the current guarantee interval. For example, if a maximum leakage energy penalty is guaranteed to be 2% over 100 monitoring intervals each 50 cycles long, then token counting guard mechanism 524 initializes the token bag to 100 tokens.

At the end of each monitoring interval, token counting guard mechanism 524 updates the token bag depending on the energy savings or penalty estimated by success monitor 502 over the guarantee interval. Token counting guard mechanism 524 increases the token bag if energy was saved or decreases the token bag if energy was wasted. The quantity by which the token bag is updated corresponds to the token equivalent of the energy saved or wasted.

At the beginning of each monitoring interval, token counting guard mechanism 524 makes a decision, based on the number of tokens in the bag, whether to enable power gating for the next monitoring interval. If there are enough tokens to tolerate the worst possible behavior for the next monitoring interval, then token counting guard mechanism 524 enables power gating for the unit. Otherwise, token counting guard mechanism 524 disables power gating for the unit. Once token counting guard mechanism 524 disables power gating for the unit, the power gating remains disabled until the end of the guarantee interval when tokens become available again. The benefit of token counting guard mechanism 524 is that token counting guard mechanism 524 limits the penalty incurred by power gating in the worst-case scenario. However, the power gating bound should be achieved without disabling power gating when power gating could save energy. The key to achieving this goal is that there is a significant amount of energy savings slack across one guarantee interval for most workloads. The power gating scheme is only disabled when all tokens have been consumed for that guarantee interval. By disabling power gating only in instances when power gating probably wastes energy, data processing system 500 encounters slightly greater energy savings with token counting guard mechanism 524 as compared to not having token counting guard mechanism 524.

Using success monitor 502 and token counting guard mechanism 524 may not be restricted to only power gating schemes nor to power management in general. Any feature that, depending on runtime behavior, may succeed or not in reaching identified goals may benefit from the benefits provided by success monitor 502 and token counting guard mechanism 524.

In this illustrative embodiment, the second-level guard mechanism, i.e. success monitor 502, may be preferably implemented in hardware as part of the system-level support for on-chip power management, although one of ordinary skill in the art would realize a software implementation of the illustrative embodiment may be possible without departing from the spirit and scope of the invention. In this particular preferred embodiment, the first-level power-gating mechanism, i.e. first-level power gating mechanism 518, 520, or 522, includes an embedded, local control mechanism that implements an autonomous (unguarded) power-gating policy, preferably in hardware, although one of ordinary skill in the art would realize a software implementation of the illustrative embodiment may be possible without departing from the spirit and scope of the invention.

Figure 6A:
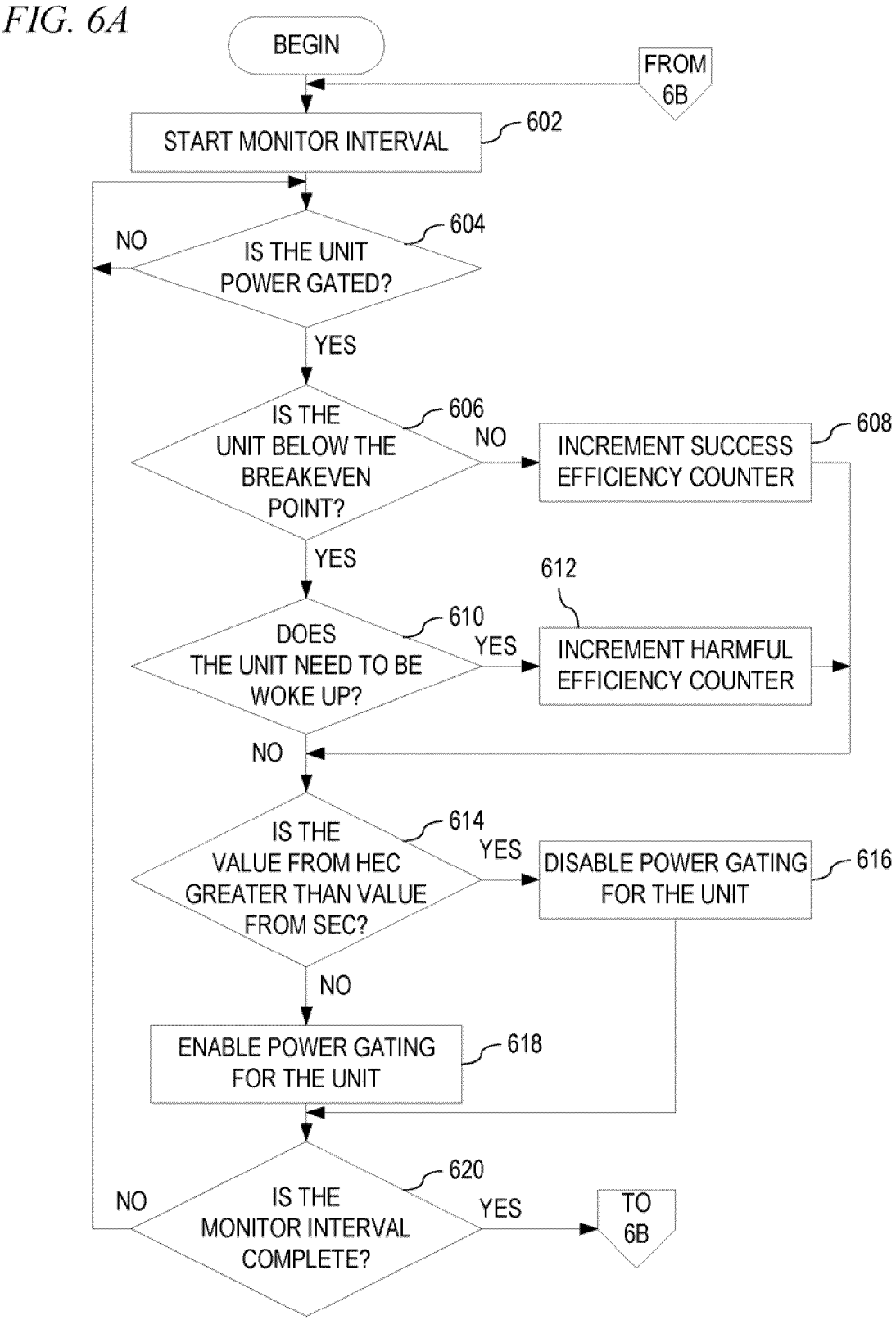
FIGS. 6A and 6B depict a flowchart for the operation performed by a success monitor in a two-level guarded predictive power gating of a set of units within a data processing system in accordance with an illustrative embodiment.
Figure 6B:
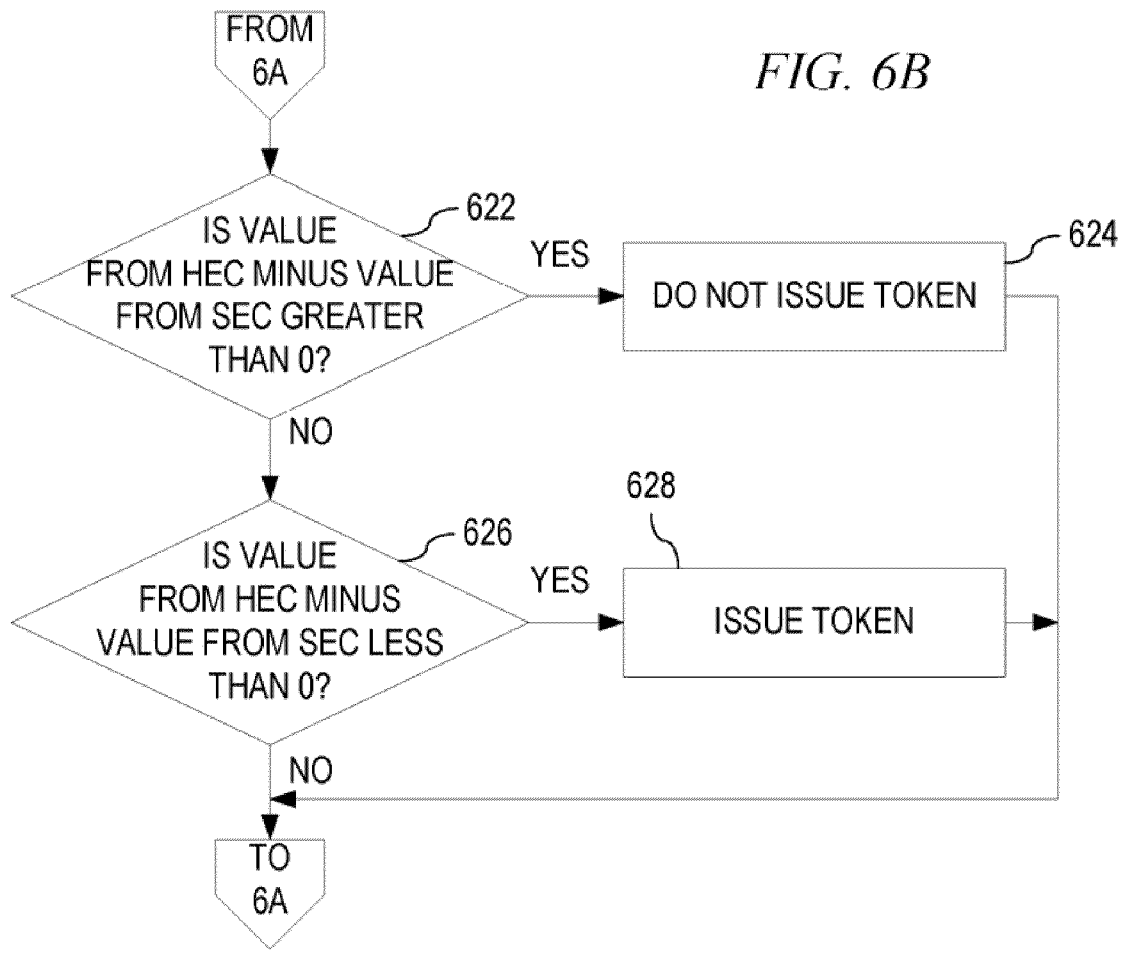

FIGS. 6A and 6B depicts a flowchart for the operation performed by a success monitor in a two-level guarded predictive power gating of a set of units within a data processing system in accordance with an illustrative embodiment. The operation performed by the success monitor is described in terms of monitoring a single unit but is performed for all predetermined units within the data processing system. As the operation begins, the success monitor starts a monitoring interval (step 602) and determines whether the unit is power gated (step 604). If at step 604 the unit is not being power gated, the operation returns to step 604. If at step 604 the unit is being power gated, then the success monitor determines whether a count of the idle cycles for the unit is below a breakeven point (step 606). If at step 606 the count of the idle cycles is above the breakeven point, the success monitor increments a success efficiency counter (SEC) (step 608). If at step 606 the count of the idle cycles is below the breakeven point, then the success monitor determines whether the unit needs to be woke up (step 610). If at step 610 the unit need to be woke up, then the success monitor increments a harmful efficiency counter (HEC) (step 612).

From steps 608, 610, and 612 the success monitor determines whether the value from the harmful efficiency counter (HEC) is greater than the value from the success efficiency counter (SEC) (step 614). If at step 614 the value from the harmful efficiency counter (HEC) is greater than the value from the success efficiency counter (SEC), then the success monitor disables the power gating for the unit (step 616). If at step 614 the value from the harmful efficiency counter (HEC) is less than the value from the success efficiency counter (SEC), then the success monitor enables power gating for the unit (step 618). From steps 616 and 618 the success monitor determines whether the monitoring interval is complete (step 620). If at step 620 the monitor interval is not complete, then the operation returns to step 604.

If at step 620 the monitoring interval is complete, then the success monitor determines whether the value from the harmful efficiency counter (HEC) minus the value from the success efficiency counter (SEC) is greater than zero (0) (step 622). If at step 622 the value from the harmful efficiency counter (HEC) minus the value from the success efficiency counter (SEC) is greater than zero (0), then the success monitor does not issue a token (step 624), with the operation returning to step 602. If at step 622 the value from the harmful efficiency counter (HEC) minus the value from the success efficiency counter (SEC) fails to be greater than zero, then the success monitor determines whether the value from the harmful efficiency counter (HEC) minus the value from the success efficiency counter (SEC) is less than zero (0) (step 626). If at step 626 the value from the harmful efficiency counter (HEC) minus the value from the success efficiency counter (SEC) is less than zero (0), then the success monitor issues a token to a token counting guard mechanism (step 628), with the operation returning to step 602 thereafter. If at step 626 the value from the harmful efficiency counter (HEC) minus the value from the success efficiency counter (SEC) fails to be less than zero (0), then the operation returns to step 602.

Figure 7:
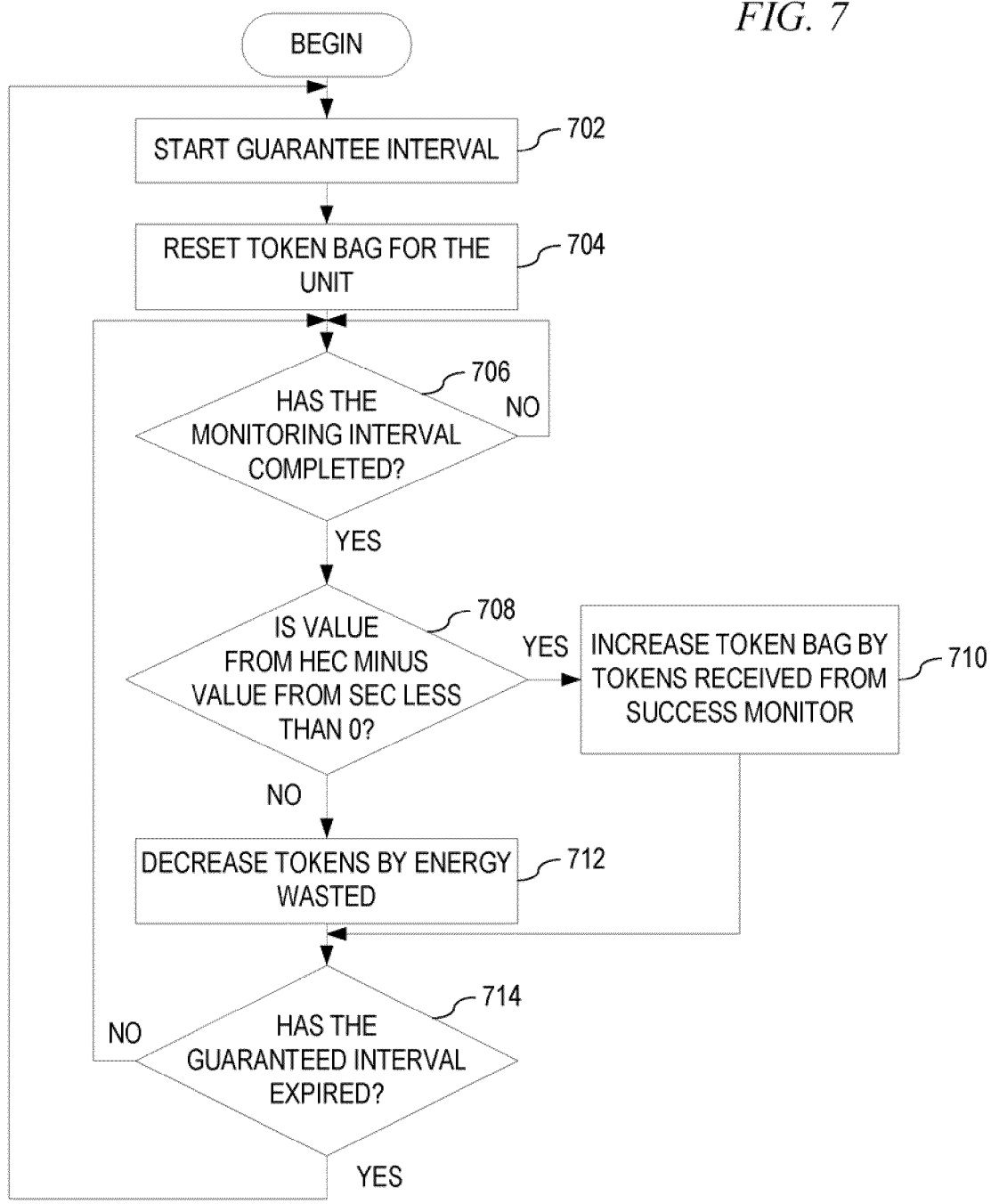
FIG. 7 depicts a flowchart for the operation performed by a token counting guard mechanism in a two-level guarded predictive power gating of a set of units within a data processing system in accordance with an illustrative embodiment.

FIG. 7 depicts a flowchart for the operation performed by a token counting guard mechanism in a two-level guarded predictive power gating of a set of units within a data processing system in accordance with an illustrative embodiment. The operation performed by the success monitor is described in terms of monitoring a single unit but is performed for all predetermined units within the data processing system. As the operation begins, the token counting guard mechanism starts a guarantee interval (step 702) and resets a token bag for the unit (step 704). The token counting guard mechanism then determines whether the monitoring interval for the unit has completed (step 706). If at step 706 the monitoring interval has not completed, then the operation returns to step 706. If at step 706 the monitoring interval has completed, then the token counting guard mechanism determines whether the value from the harmful efficiency counter (HEC) minus the value from the success efficiency counter (SEC) is less than zero (0) (step 708).

If at step 708 the value from the harmful efficiency counter (HEC) minus the value from the success efficiency counter (SEC) is less than zero (0), then the token counting guard mechanism increases the token bag for the unit by the amount of tokens received from the success monitor (step 710). If at step 708 the value from the harmful efficiency counter (HEC) minus the value from the success efficiency counter (SEC) fails to be less than zero (0), then the token counting guard mechanism decreases the tokens for the unit by the energy wasted (step 712). From steps 710 and 712 the token counting guard mechanism determines whether the guaranteed interval has expired (step 714). If at step 714 the guaranteed interval has not expired, then the operation returns to step 706. If at step 714 the guaranteed interval has expired, then the operation returns to step 702.

Thus, one illustrative embodiment provides a mechanism for assessing the inherent predictability and detectability based on observed usage behavior at a hardware level. The illustrative embodiment may use a global second-level control algorithm that decides when to enable or disable each first-level power-gating control mechanism targeted to act on the corresponding monitored unit for power gating. Additionally, the illustrative embodiment may use a set of past history sequences for which the future will most likely witness a favorable power gating opportunity (FPGO) to directly enable or disable each monitored unit for power gating, bypassing any first-level power-gating controller, if present.

In another illustrative embodiment, a mechanism is provided for implementing simple heuristics to assess the power-saving efficiency of the lower-level (i.e. first-level) predictor while making the decision to enable/disable that lower-level predictor. The resulting mechanism serves as a guarded mechanism, where the overall monitored units are generally guaranteed not to add more power than what is saved in extreme workload instances. As such, the second level control heuristic serves as a guard mechanism to ensure that the net power savings effected is never negative. The illustrative embodiment consists of several different alternate heuristics to effect the guard mechanism.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for predictively power gating a set of units within the data processing system, the method comprising:
   monitoring, by a second-level power gating controller in the data processing system, a set of events for each unit in a set of units within the data processing system;
   identifying, by the second-level power gating controller, idle sequences of a predetermined number of cycles within the events from each unit where the unit is idle;
   determining, by the second-level power gating controller, preceding sequences of a predetermined length that precede the idle sequences;
   determining, by the second-level power gating controller, an accuracy of the preceding sequences; and
   responsive to the accuracy being above a threshold, sending, by the second-level power gating controller, a permit command to a first-level power gating mechanism associated with the unit, wherein the permit command allows the first-level power gating mechanism to power gate the unit.

2. The method of claim 1, wherein the accuracy is determined using the following formula:

$$\text{Accuracy}(i) = \frac{desiredOutcome(i)}{desiredOutcome(i) + undesiredOutcome(i)}$$

wherein the desiredOutcome represents a number of desired sequences that have occurred in a specified corner and wherein the "undesiredOutcome" represents a number of sequences that have occurred in the specified corner which are different from the desired sequences.

3. The method of claim 1, further comprising:
   responsive to the accuracy being below the threshold, sending, by the second-level power gating controller, a prevent command to the first-level power gating mechanism associated with the unit, wherein the prevent command prevents the first-level power gating mechanism from power gating the unit.

4. The method of claim 1, further comprising:
   determining, by the second-level power gating controller, a predictability of the preceding sequences;
   determining, by the second-level power gating controller, a detectability of the preceding sequences; and
   using the predictability and the detectability, calculating, by the second-level power gating controller, an optimized length that replaces the predetermined length.

5. The method of claim 4, wherein the predictability is determined using the following formula:

$$P = \frac{\sum_{i \in \Omega} desiredOutcome(i)}{\sum_{i \in \Omega} desiredOutcome(i) + undesiredOutcome(i)}$$

wherein the desiredOutcome represents a number of desired sequences that have occurred in a specified corner and wherein the "undesiredOutcome" represents a number of sequences that have occurred in the specified corner which are different from the desired sequences.

6. The method of claim 4, wherein the detectability is determined using the following formula:

$$D = \frac{\sum_{i \in \Omega} desiredOutcome(i)}{\sum_{j \in \Lambda} desiredOutcome(j)}$$

wherein the desiredOutcome represents a number of desired sequences that have occurred in a specified corner and wherein the "undesiredOutcome" represents a number of sequences that have occurred in the specified corner which are different from the desired sequences.

7. The method of claim 1, wherein the set of events is a historical sequence of events indicating states of the unit, wherein the states are either idle or active.

8. A computer program product comprising a computer readable storage medium having a computer readable program recorded thereon, wherein the computer readable program, when executed on a computing device, causes the computing device to:
   monitor a set of events for each unit in a set of units within the data processing system;

identify idle sequences of a predetermined number of cycles within the events from each unit where the unit is idle;
determine preceding sequences of a predetermined length that precede the idle sequences;
determine an accuracy of the preceding sequences; and
responsive to the accuracy being above a threshold, send a permit command to a first-level power gating mechanism associated with the unit, wherein the permit command allows the first-level power gating mechanism to power gate the unit.

9. The computer program product of claim 8, wherein the accuracy is determined using the following formula:

$$\text{Accuracy}(i) = \frac{desiredOutcome(i)}{desiredOutcome(i) + undesiredOutcome(i)}$$

wherein the desiredOutcome represents a number of desired sequences that have occurred in a specified corner and wherein the "undesiredOutcome" represents a number of sequences that have occurred in the specified corner which are different from the desired sequences.

10. The computer program product of claim 8, wherein the computer readable program further causes the computing device to:
responsive to the accuracy being below the threshold, send a prevent command to the first-level power gating mechanism associated with the unit, wherein the prevent command prevents the first-level power gating mechanism from power gating the unit.

11. The computer program product of claim 8, wherein the computer readable program further causes the computing device to:
determine a predictability of the preceding sequences;
determine a detectability of the preceding sequences; and
using the predictability and the detectability, calculate an optimized length that replaces the predetermined length.

12. The computer program product of claim 11, wherein the predictability is determined using the following formula:

$$P = \frac{\sum_{i \in \Omega} desiredOutcome(i)}{\sum_{i \in \Omega} desiredOutcome(i) + undesiredOutcome(i)}$$

wherein the desiredOutcome represents a number of desired sequences that have occurred in a specified corner and wherein the "undesiredOutcome" represents a number of sequences that have occurred in the specified corner which are different from the desired sequences.

13. The computer program product of claim 11, wherein the detectability is determined using the following formula:

$$D = \frac{\sum_{i \in \Omega} desiredOutcome(i)}{\sum_{j \in \Lambda} desiredOutcome(j)}$$

wherein the desiredOutcome represents a number of desired sequences that have occurred in a specified corner and wherein the "undesiredOutcome" represents a number of sequences that have occurred in the specified corner which are different from the desired sequences.

14. The computer program product of claim 8, wherein the set of events is a historical sequence of events indicating states of the unit, wherein the states are either idle or active.

15. An apparatus, comprising:
a processor; and
a memory coupled to the processor, wherein the memory comprises instructions which, when executed by the processor, cause the processor to:
monitor a set of events for each unit in a set of units within the data processing system;
identify idle sequences of a predetermined number of cycles within the events from each unit where the unit is idle;
determine preceding sequences of a predetermined length that precede the idle sequences;
determine an accuracy of the preceding sequences; and
responsive to the accuracy being above a threshold, send a permit command to a first-level power gating mechanism associated with the unit, wherein the permit command allows the first-level power gating mechanism to power gate the unit.

16. The apparatus of claim 15, wherein the accuracy is determined using the following formula:

$$\text{Accuracy}(i) = \frac{desiredOutcome(i)}{desiredOutcome(i) + undesiredOutcome(i)}$$

wherein the desiredOutcome represents a number of desired sequences that have occurred in a specified corner and wherein the "undesiredOutcome" represents a number of sequences that have occurred in the specified corner which are different from the desired sequences.

17. The apparatus of claim 15, wherein the instructions further cause the processor to:
responsive to the accuracy being below the threshold, send a prevent command to the first-level power gating mechanism associated with the unit, wherein the prevent command prevents the first-level power gating mechanism from power gating the unit.

18. The apparatus of claim 15, wherein the instructions further cause the processor to:
determine a predictability of the preceding sequences;
determine a detectability of the preceding sequences; and
using the predictability and the detectability, calculate an optimized length that replaces the predetermined length.

19. The apparatus of claim 18, wherein the predictability is determined using the following formula:

$$P = \frac{\sum_{i \in \Omega} desiredOutcome(i)}{\sum_{i \in \Omega} desiredOutcome(i) + undesiredOutcome(i)}$$

wherein the desiredOutcome represents a number of desired sequences that have occurred in a specified corner and wherein the "undesiredOutcome" represents a number of sequences that have occurred in the specified corner which are different from the desired sequences.

20. The apparatus of claim 18, wherein the detectability is determined using the following formula:

$$D = \frac{\sum_{i \in \Omega} desiredOutcome(i)}{\sum_{j \in \Lambda} desiredOutcome(j)}$$

wherein the desiredOutcome represents a number of desired sequences that have occurred in a specified corner and wherein the "undesiredOutcome" represents a number of sequences that have occurred in the specified corner which are different from the desired sequences.

* * * * *